J. B. Sargent,
Snap Hook,
N° 70,750.        Patented Nov. 12, 1867.
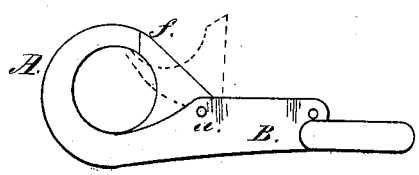
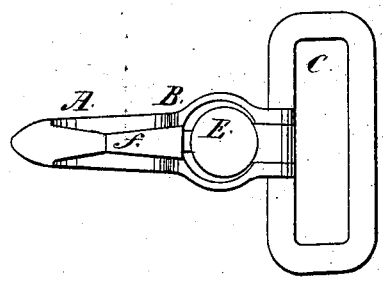
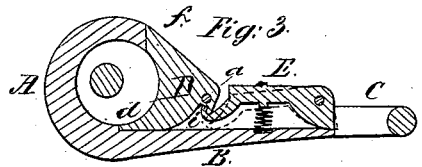
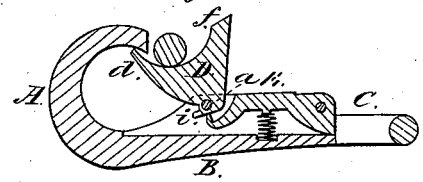
Witnesses.
John H. Shumway
A. J. Tibbits
Inventor:
J. B. Sargent
By his Attorney
Jno. E. Earle

United States Patent Office.

J. B. SARGENT, OF NEW HAVEN, CONNECTICUT.

Letters Patent No. 70,750, dated November 12, 1867.

IMPROVED SNAP-HOOK.

*The Schedule referred to in these Letters Patent and making part of the same.*

TO ALL WHOM IT MAY CONCERN:

Be it known that I, J. B. SARGENT, of New Haven, in the county of New Haven, and State of Connecticut, have invented a new Improvement in Snap-Hooks; and I do hereby declare the following, when taken in connection with the accompanying drawings, and the letters of reference marked thereon, to be a full, clear, and exact description of the same, and which said drawings constitute part of this specification, and represent, in—

Figure 1, a side view,

Figure 2 a top view,

Figure 3 a central section, the hook closed, and in

Figure 4 the same with the hook open.

This invention relates to an improvement in the construction of the snap for hooks for various purposes, and such as are commonly known as snap-hooks; and consists in the peculiar construction of the snap, whereby it is locked when closed.

To enable others to construct my improvement, I will proceed to describe the same as illustrated in the accompanying drawings.

A is the hook, B the shank, and C the loop, constructed and formed in accordance with the purpose for which the hook is designed. In the shank and upon a pivot, $a$, I hang a double tongue, D, the said shank being recessed, as denoted in fig. 4, so as to receive the lower tongue $d$, as seen in fig. 3; and the upper tongue $f$, when so closed, corresponds to and closes the hook, as denoted in figs. 1 and 3, so that in clasping the hook upon a ring, or to whatever it is desired to attach the hook, the hook is placed thereon so that the thing to be attached will rest upon the lower tongue, as seen in fig. 4; then, drawing down the tongue, is turned down to permit its free passage within the grasp of the hook, and close the tongue, as denoted in fig. 3. To secure the tongue thus turned down, I form a notch, $i$, in the rear end of the tongue, as seen in figs. 3 and 4, and in the shank, back of the tongue, I arrange a thumb-piece, E, in any convenient manner, its forward end being formed so as to catch into the notch $i$ of the tongue, as seen in fig. 3; then the thumb-piece being pressed up by a spring beneath, or equivalent device, so that when closed, as in fig. 3, the tongue is securely locked, and cannot by any possible accident be disengaged but by depressing the thumb-piece, as denoted in red, fig. 3, so as to relieve the tongue. The hook may be opened, as denoted in fig. 4; then the thumb-piece, bearing upon the under side of the tongue, tends to hold the tongue in an open position, and may be arranged to hold it in this position with considerable strength, by forming a notch in the hook at that point, but this notch should be so that the hook may be forced from the notch without mechanically depressing the thumb-piece. Held in this open position the hook is simply placed upon the thing to be clasped, and drawn down, the hook on the thumb-piece snaps into the notch $i$, and firmly holds the tongue in that closed position.

Having thus fully described my invention, what I claim as new and useful, and desire to secure by Letters Patent, is—

1. The double tongue D, in combination with the hook A, when constructed so as to operate substantially as described.

2. The thumb-piece E, in combination with the tongue D of a snap-hook, so as to lock and secure the snap when closed.

J. B. SARGENT.

Witnesses:
JOHN H. SHUMWAY,
A. J. TIBBITS.